United States Patent
Wang et al.

(10) Patent No.: US 9,627,904 B2
(45) Date of Patent: Apr. 18, 2017

(54) CHARGING METHOD AND CHARGER

(71) Applicant: Huawei Device Co., Ltd., Shenzhen (CN)

(72) Inventors: Weijie Wang, Shanghai (CN); Kai Zhou, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 52 days.

(21) Appl. No.: 14/719,744

(22) Filed: May 22, 2015

(65) Prior Publication Data

US 2015/0256016 A1    Sep. 10, 2015

Related U.S. Application Data

(63) Continuation of application No. PCT/CN2013/087639, filed on Nov. 21, 2013.

(30) Foreign Application Priority Data

Nov. 23, 2012    (CN) .......................... 2012 1 0482514

(51) Int. Cl.
*H02J 7/24* (2006.01)
*H02J 7/00* (2006.01)
*H01M 10/44* (2006.01)

(52) U.S. Cl.
CPC ........... *H02J 7/0052* (2013.01); *H01M 10/44* (2013.01); *H02J 7/007* (2013.01); *H02J 7/0086* (2013.01)

(58) Field of Classification Search
CPC ................................ H02J 7/0052; H02J 7/007
(Continued)

(56) References Cited

U.S. PATENT DOCUMENTS

2002/0158609 A1   10/2002   Lavington et al.
2008/0111521 A1*   5/2008   So ......................... H01M 10/44
                                                                        320/137
2012/0249085 A1   10/2012   Lin et al.

FOREIGN PATENT DOCUMENTS

CN    101340011 A    1/2009
CN    101364743 A    2/2009
(Continued)

OTHER PUBLICATIONS

Foreign Communication From a Counterpart Application, European Application No. 13857514.7, Extended European Search Report dated Sep. 4, 2015, 8 pages.
(Continued)

*Primary Examiner* — Drew A Dunn
*Assistant Examiner* — Zixuan Zhou
(74) *Attorney, Agent, or Firm* — Conley Rose, P.C.

(57) ABSTRACT

A charging method and a charger are provided that relate to the field of electronics, and can adjust a charging current of the charger in real time and avoid a short circuit of the charger. The method in the present invention includes setting a multi-level charging current; when a terminal is charged at a present charging current, acquiring a real-time charging voltage corresponding to the present charging current; determining whether a difference between the real-time charging voltage corresponding to the present charging current and an ideal charging voltage exceeds a voltage drop threshold; when the difference does not exceed the voltage drop threshold, boosting a charging current to a next-level charging current; and when the difference exceeds the voltage drop threshold, reducing the charging current to a previous-level charging current, so as to select an appropriate charging current to charge the terminal.

8 Claims, 4 Drawing Sheets

(58) Field of Classification Search
USPC .................................................. 320/159, 164
See application file for complete search history.

(56) References Cited

FOREIGN PATENT DOCUMENTS

| | | |
|---|---|---|
| CN | 201282176 Y | 7/2009 |
| CN | 102208702 A | 10/2011 |
| CN | 103000965 A | 3/2013 |
| WO | 2011155186 A1 | 12/2011 |

OTHER PUBLICATIONS

Partial English Translation and Abstract of Chinese Patent Application No. CN101340011A, May 12, 2015, 5 pages.
Partial English Translation and Abstract of Chinese Patent Application No. CN103000965A, May 12, 2015, 7 pages.
Partial English Translation and Abstract of Chinese Patent Application No. CN101364743A, Apr. 9, 2015, 32 pages.
Foreign Communication From a Counterpart Application, Chinese Application No. 201210482514.6, Chinese Office Action dated Jul. 3, 2015, 7 pages.
Foreign Communication From a Counterpart Application, PCT Application No. PCT/CN2013/087639, English Translation of International Search Report dated Feb. 27, 2014, 3 pages.
Foreign Communication From a Counterpart Application, PCT Application No. PCT/CN2013/087639, English Translation of Written Opinion dated Feb. 27, 2014, 7 pages.

* cited by examiner

CHARGING METHOD AND CHARGER

CROSS-REFERENCE TO RELATED APPLICATIONS

This application is a continuation of International Application No. PCT/CN2013/087639, filed on Nov. 21, 2013, which claims priority to Chinese Patent Application No. 201210482514.6, filed on Nov. 23, 2012, both of which are hereby incorporated by reference in their entireties.

TECHNICAL FIELD

The present invention relates to the field of electronics, and in particular, to a charging method and a charger.

BACKGROUND

As the electronic technologies advance quickly, generational shifts of electronic products also accelerate day by day. During use, most electronic products need to be charged to maintain normal operation.

In the prior art, a mobile phone is basically charged at a fixed current, and a fixed current charging process may be divided into three stages: trickle charging, constant current charging, and constant voltage charging. Trickle charging is first performed; when a charging voltage during the trickle charging reaches a predetermined voltage of constant current charging, constant current charging is performed; when the charging voltage during the constant current charging reaches a predetermined voltage of constant voltage charging, constant voltage charging is performed. For example, a current of trickle charging uses 100 milliamp (mA), a current of constant current charging uses 1 amp (A), and a voltage of constant voltage charging uses 4 volts (V).

In the process of implementing charging, the inventor finds that the prior art at least has the following problems.

When a charger charges a high-current mobile phone at an early stage, a current at a constant current stage uses a fixed high current value in the charging process; because a load current of the charger is small at the early stage, if the charger is in a high-current state, a short circuit phenomenon of the charger is caused.

SUMMARY

Embodiments of the present invention provide a charging method and a charger, which can adjust a charging current of the charger in real time, and avoid a short circuit of the charger.

To achieve the foregoing objectives, the following technical solutions are used in the embodiments of the present invention.

A first aspect of the present invention provides a charging method, including, when a terminal is charged at a present charging current, acquiring a real-time charging voltage corresponding to the present charging current; determining whether a difference between the real-time charging voltage corresponding to the present charging current and an ideal charging voltage exceeds a preset voltage drop threshold, where the ideal charging voltage is an electromotive force provided by a charging power supply when a charging circuit is not connected to load, and the voltage drop threshold is a maximum divided voltage generated when a maximum load current of a charger passes an internal resistor of the charger; when the difference between the real-time charging voltage corresponding to the present charging current and the ideal charging voltage exceeds the voltage drop threshold, reducing a charging current to a previous-level charging current of the present charging current, so that the terminal is charged at the previous-level charging current; and when the difference between the real-time charging voltage corresponding to the present charging current and the ideal charging voltage does not exceed the voltage drop threshold, boosting the charging current to a next-level charging current of the present charging current, so as to continue to determine whether the difference between the real-time charging voltage and the ideal charging voltage exceeds the voltage drop threshold, and when the difference does not exceed the voltage drop threshold, continuing to boost the charging current to the highest-level charging current.

With reference to the first aspect, in a first possible implementation manner, after the reducing a charging current to a previous-level charging current of the present charging current, the method further includes dividing a difference between a real-time charging voltage corresponding to the previous-level charging current and the ideal charging voltage by the previous-level charging current, to obtain a resistance of the internal resistor of the charger; dividing the voltage drop threshold by the resistance of the internal resistor of the charger, to obtain a critical charging current; and obtaining a corrected charging current A according to a formula $A = A_0 * k$, so that the terminal is charged at the corrected charging current A until charging is complete, where $A_0$ is the critical charging current, and k is a parameter less than 1 and greater than 0.

With reference to the first aspect or the first possible implementation manner of the first aspect, in a second possible implementation manner, before the terminal is charged at the present charging current, the method further includes charging the terminal in a trickle charging mode until a charging voltage reaches a predetermined voltage at a constant current degree.

A second aspect of the present invention provides a charger, including a charging unit configured to charge a terminal; a charging voltage acquiring unit configured to, when the terminal is charged at a present charging current, acquire a real-time charging voltage corresponding to the present charging current; a determining unit configured to determine whether a difference between the real-time charging voltage corresponding to the present charging current and an ideal charging voltage exceeds a preset voltage drop threshold, where the ideal charging voltage is an electromotive force provided by a charging power supply when a charging circuit is not connected to load, and the voltage drop threshold is a maximum divided voltage generated when a maximum load current of the charger passes an internal resistor of the charger; a charging current reducing unit configured to, when the difference between the real-time charging voltage corresponding to the present charging current and the ideal charging voltage exceeds the voltage drop threshold, reduce a charging current to a previous-level charging current of the present charging current, so that the terminal is charged at the previous-level charging current; and a charging current boost unit configured to, when the difference between the real-time charging voltage corresponding to the present charging current and the ideal charging voltage does not exceed the voltage drop threshold, boost the charging current to a next-level charging current of the present charging current, so that the determining unit continues to determine whether the difference between the real-time charging voltage and the ideal charging voltage exceeds the voltage drop threshold; and when the difference does not exceed the voltage drop threshold, continue to boost the charging current until reaching the highest-level charging current.

With reference to the second aspect, in a first possible implementation manner, the charger further includes a charger internal resistance acquiring unit configured to, after the charging current is reduced to the previous-level charging current of the present charging current, divide a difference between a real-time charging voltage corresponding to the previous-level charging current and the ideal charging voltage by the previous-level charging current, to obtain a resistance of the internal resistor of the charger; a critical charging current acquiring unit configured to divide the voltage drop threshold by the resistance of the internal resistor of the charger, to obtain a critical charging current; and a corrected charging current acquiring unit configured to obtain a corrected charging current A according to a formula $A=A_0*k$, so that the terminal is charged at the corrected charging current A until charging is complete, where $A_0$ is the corrected charging current, and k is a parameter less than 1 and greater than 0.

With reference to the second aspect or the first possible implementation manner of the second aspect, in a second possible implementation manner, the charging unit is further configured to, before the terminal is charged at the present charging current, charge the terminal in a trickle charging mode until a charging voltage reaches a predetermined voltage at a constant current degree.

With reference to the second aspect and the foregoing possible implementation manners, in another possible implementation manner, the charging voltage acquiring unit and the determining unit are integrated in an analog-to-digital converter (ADC) voltage detection chip or a voltage comparator.

According to the charging method and the charger that are provided in the embodiments of the present invention, a multi-level charging current is set; when a terminal is charged at a present charging current, a real-time charging voltage corresponding to the present charging current is acquired; it is determined whether a difference between the real-time charging voltage corresponding to the present charging current and an ideal charging voltage exceeds a voltage drop threshold; when the difference does not exceed the voltage drop threshold, a charging current is boosted to a next-level charging current; and when the difference exceeds the voltage drop threshold, the charging current is reduced to a previous-level charging current, so as to select an appropriate charging current to charge the terminal. Compared with the prior art in which charging is performed by using a fixed high current, the present invention can adjust the charging current in real time according to a current load capacity of the charger, and avoid a phenomenon that a short circuit occurs in the charger due to a charging current greater than a maximum load current.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1A:
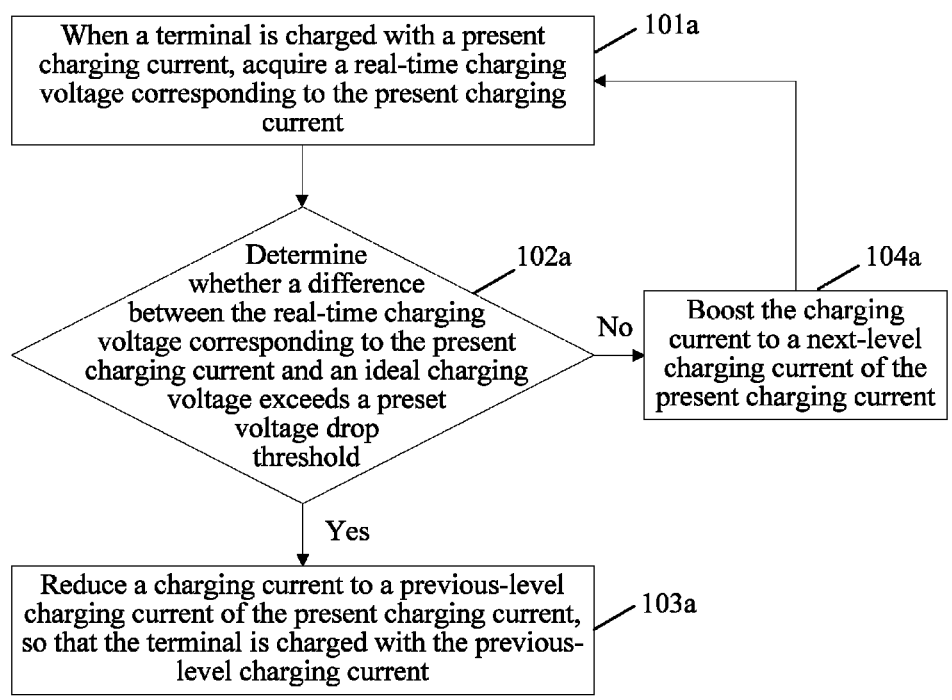
FIG. 1A is a flowchart of a charging method according to Embodiment 1 of the present invention.

This embodiment of the present invention provides a charging method. As shown in FIG. 1A, the method includes the following steps.

101a: When a terminal is charged at a present charging current, acquire a real-time charging voltage corresponding to the present charging current.

102a: Determine whether a difference between the real-time charging voltage corresponding to the present charging current and an ideal charging voltage exceeds a preset voltage drop threshold.

The ideal charging voltage is an electromotive force provided by a charging power supply when a charging circuit is not connected to load, and the voltage drop threshold is a maximum divided voltage generated when a maximum load current of a charger passes an internal resistor of the charger.

103a: If the difference between the real-time charging voltage corresponding to the present charging current and the ideal charging voltage exceeds the voltage drop threshold, reduce a charging current to a previous-level charging current of the present charging current, so that the terminal is charged at the previous-level charging current.

104a: If the difference between the real-time charging voltage corresponding to the present charging current and the ideal charging voltage does not exceed the voltage drop threshold, boost the charging current to a next-level charging current of the present charging current.

After step 104a is complete, turn to step 101a, continue to perform step 101a and step 102a, and selectively perform step 103a or step 104a according to a determining result of step 102a.

It can be known from the foregoing steps that, if the difference between the real-time charging voltage corresponding to the present charging current and the ideal charging voltage exceeds the voltage drop threshold, the charging current is reduced to the previous-level charging current of the present charging current, and then, charging is performed at the previous-level charging current. If the difference between the real-time charging voltage corresponding to the present charging current and the ideal charging voltage does not exceed the voltage drop threshold, the charging current is boosted to the next-level charging current of the present charging current. When the highest-level charging current is reached, if a difference between a real-time charging voltage of the highest-level charging current and the ideal charging voltage still does not exceed the voltage drop threshold, charging is performed at the highest-level charging current until charging is complete.

Figure 1B:
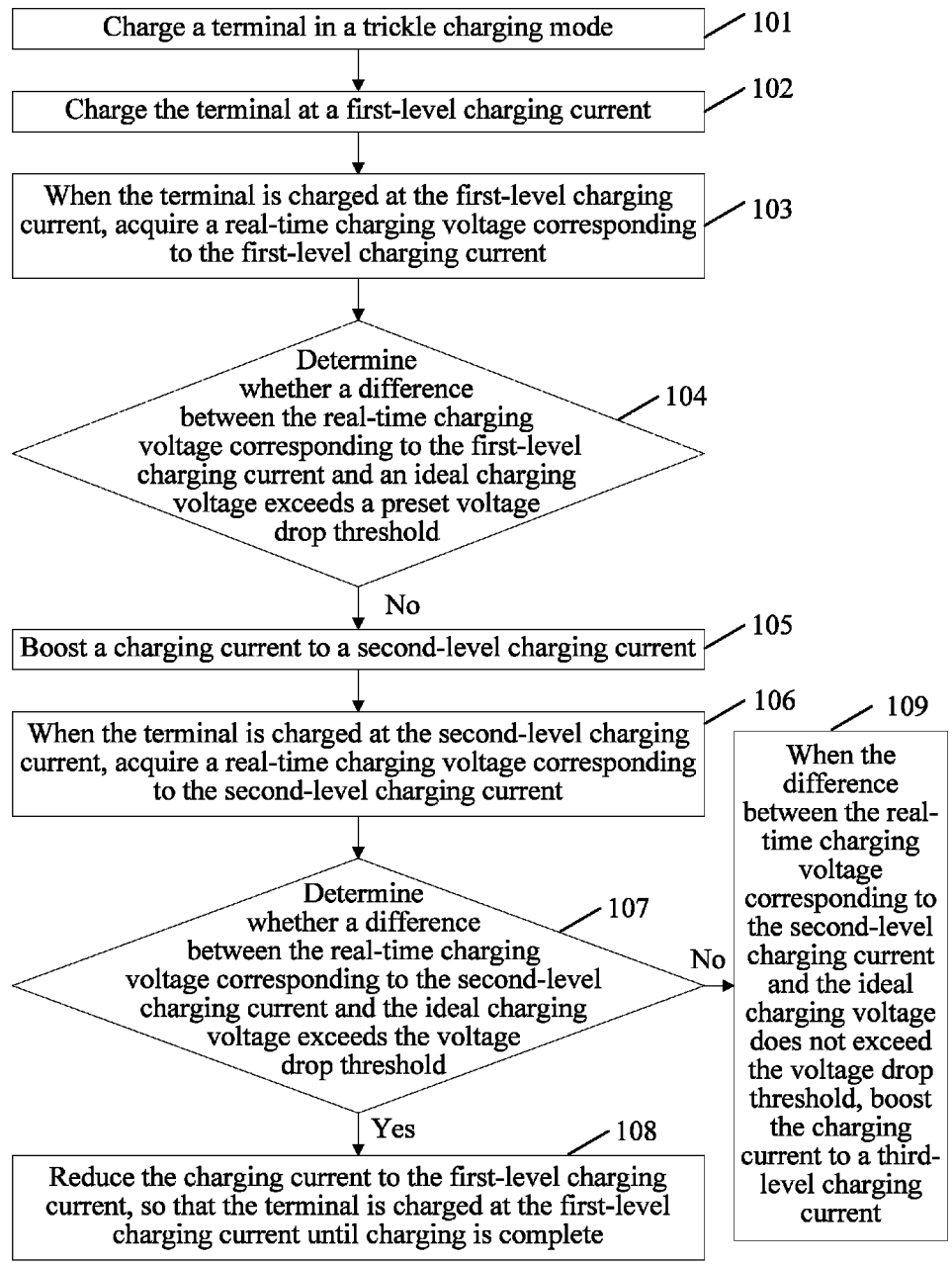
FIG. 1B is a flowchart of another charging method according to Embodiment 2 of the present invention.

Based on the charging method shown in FIG. 1A, this embodiment of the present invention further provides a charging method. As shown in FIG. 1B, the method includes the following steps.

101: Charge a terminal in a trickle charging mode.

The trickle charging mode is a low-current charging mode (for example, in an actual application, a current at which a mobile phone is charged in the trickle charging mode may be 100 mA), and when a charging voltage during trickle charging reaches a predetermined constant current charging voltage, constant current charging starts to be performed. Specifically, when constant current charging is performed, the following step 102 is first performed.

102: Charge the terminal at a first-level charging current.

The first-level charging current is a charging current with the smallest current value in preset levels of charging current.

103: When the terminal is charged at the first-level charging current, acquire a real-time charging voltage corresponding to the first-level charging current.

In order to avoid a phenomenon that a short circuit occurs in a charging circuit in an initial charging stage because the charging current is excessively large, a multi-level ascending charging current is set, for example, a multi-level ascending charging current of a charger is set to a first level of 10 mA, a second level of 200 mA, a third level of 400 mA, a fourth level of 600 mA, a fifth level of 800 mA, and a sixth level of 1000 mA. When the terminal is charged, charging is first performed at the first-level charging current. When the terminal is charged at the first-level charging current, the real-time charging voltage corresponding to the first-level charging current is acquired, for example, when the terminal is charged at the first-level charging current of 10 mA, a corresponding real-time charging voltage of 4.98 V is acquired.

104: Determine whether a difference between the real-time charging voltage corresponding to the first-level charging current and an ideal charging voltage exceeds a preset voltage drop threshold, where the ideal charging voltage is an electromotive force provided by a charging power supply when a charging circuit is not connected to load.

For an ideal charger, a charging voltage is determined by the charger, and is independent of an external circuit and a current passing the charger. An ideal charging voltage is an electromotive force provided by a charging power supply when a charging circuit of the ideal charger is not connected to load. For example, when a charging circuit of an ideal charger is not connected to load, it is detected that an electromotive force provided by a charging power supply is 5 V, and then an ideal charging voltage of the charger is 5 V.

Due to a limit of a load current of an electronic component in the charging circuit, a load current of the charger is also limited during use, that is, the charger has the maximum load current. In a process of charging the terminal, when the charging current is less than the maximum load current of the charger, the real-time charging voltage of the charger does not change obviously; only when the charging current is greater than the maximum load current of the charger, the real-time charging voltage of the charger drops obviously. For example, a charging voltage of an ideal charger is 5 V, and a maximum load current is 500 mA; when a charging current is 400 mA, a real-time charging voltage of the charger is 4.99 V; and when the charging current is 600 mA, the real-time charging voltage of the charger is 4.0 V. When the charging current is greater than the maximum load current of the charger, a reason for dropping of the real-time charging voltage of the charger is that a current passing the internal resistor of the charging circuit is excessively large, a large divided voltage is generated on the internal resistor of the charging circuit, leading to that the real-time charging voltage reduces obviously, and that a difference exists between the real-time charging voltage and the ideal charging voltage of the charger.

In order to avoid the phenomenon that the short circuit occurs in the charging circuit because the charging current is greater than the maximum load current of the charger, the voltage drop threshold is set to limit the difference between the real-time charging voltage and the ideal charging voltage; because the difference between the real-time charging voltage and the ideal charging voltage is equal to the divided voltage on the internal resistor of the charging circuit, the voltage drop threshold is the maximum divided voltage generated when the maximum load current of the charger passes the internal resistor of the charger. Therefore, a maximum charging current passing the internal resistor of the charger is correspondingly limited by limiting a maximum divided voltage on the internal resistor of the charging circuit. For example, a maximum load current of an ideal charger is 500 mA, and when a charging current of the charger is 500 mA, a divided voltage generated on an internal resistor of the charger is 0.5 V, and a voltage drop threshold of the charger is 0.5 V.

105: When the difference between the real-time charging voltage corresponding to the first-level charging current and the ideal charging voltage does not exceed the voltage drop threshold, boost a charging current to a next-level charging current of the first-level charging current, that is, a second-level charging current.

In an actual application scenario, the first-level charging current may be set to a low current, so that a drop value of the real-time charging voltage is far less than the voltage drop threshold when charging is performed by using the low current.

106: When the terminal is charged at the second-level charging current, acquire a real-time charging voltage corresponding to the second-level charging current.

107: Determine whether a difference between the real-time charging voltage corresponding to the second-level charging current and the ideal charging voltage exceeds the voltage drop threshold.

Step 108 or step 109 is performed according to a determining result of step 107.

108: When the difference between the real-time charging voltage corresponding to the second-level charging current and the ideal charging voltage exceeds the voltage drop threshold, reduce the charging current to the first-level charging current, so that the terminal is charged at the first-level charging current until charging is complete.

The second-level charging current is reduced to the first-level charging current because a phenomenon that the difference between the real-time charging voltage and the ideal charging voltage exceeds the voltage drop threshold occurs in the case of the second-level charging current. In this case, in order to ensure that the difference between the real-time charging voltage and the ideal charging voltage does not exceed the voltage drop threshold, the charger needs to charge the terminal at the first-level charging current. That is, after the charging current is reduced to the previous-level charging current of the present charging current, the charging current is no longer boosted, and the terminal is charged only at the previous-level charging current of the present charging current until charging is complete. The foregoing method in which the charging current is reduced and no longer boosted until charging is complete may be implemented by using software or in another way.

109: When the difference between the real-time charging voltage corresponding to the second-level charging current and the ideal charging voltage does not exceed the voltage drop threshold, boost the charging current to a third-level charging current.

If the difference between the real-time charging voltage corresponding to the second-level charging current and the ideal charging voltage does not exceed the voltage drop threshold, it indicates that the charger may further boost the charging current. Therefore, the second-level charging current is boosted to the third-level charging current.

After the second-level charging current is boosted to the third-level charging current, the following three cases may occur.

S1: A difference between a real-time charging voltage corresponding to the third-level charging current and the ideal charging voltage exceeds the voltage drop threshold.

In this case, the charging current needs to be reduced to the second-level charging current and maintain the second-level charging current until charging is complete.

S2: The difference between the real-time charging voltage corresponding to the third-level charging current and the ideal charging voltage does not exceed the voltage drop threshold, and the third-level charging current is not the highest-level charging current.

In this case, the charging current continues to be boosted to a fourth-level charging current. Then, the real-time charging voltage continues to be acquired, and whether the difference between the real-time charging voltage and the ideal charging voltage exceeds the voltage drop threshold is determined. For related actions, reference may be made to step 104 to step 107, and details are not described herein again.

S3: The difference between the real-time charging voltage corresponding to the third-level charging current and the ideal charging voltage does not exceed the voltage drop threshold, and the third-level charging current is the highest-level charging current.

In this case, the third-level charging current is the highest-level charging current, and cannot be further boosted. In this way, charging is performed at the third-level charging current until charging is complete.

According to the charging method provided in this embodiment of the present invention, a multi-level charging current is set; when a terminal is charged at a present charging current, a real-time charging voltage corresponding to the present charging current is acquired; it is determined whether a difference between the real-time charging voltage corresponding to the present charging current and an ideal charging voltage exceeds a voltage drop threshold; when the difference does not exceed the voltage drop threshold, a charging current is boosted to a next-level charging current; and when the difference exceeds the voltage drop threshold, the charging current is reduced to a previous-level charging current, so as to select an appropriate charging current to charge the terminal. Compared with the prior art in which charging is performed by using a fixed high current, the present invention can adjust the charging current in real time according to a current load capacity of a charger, and avoid a phenomenon that a short circuit occurs in the charger due to a charging current greater than a maximum load current.

Embodiment 2

Figure 2:
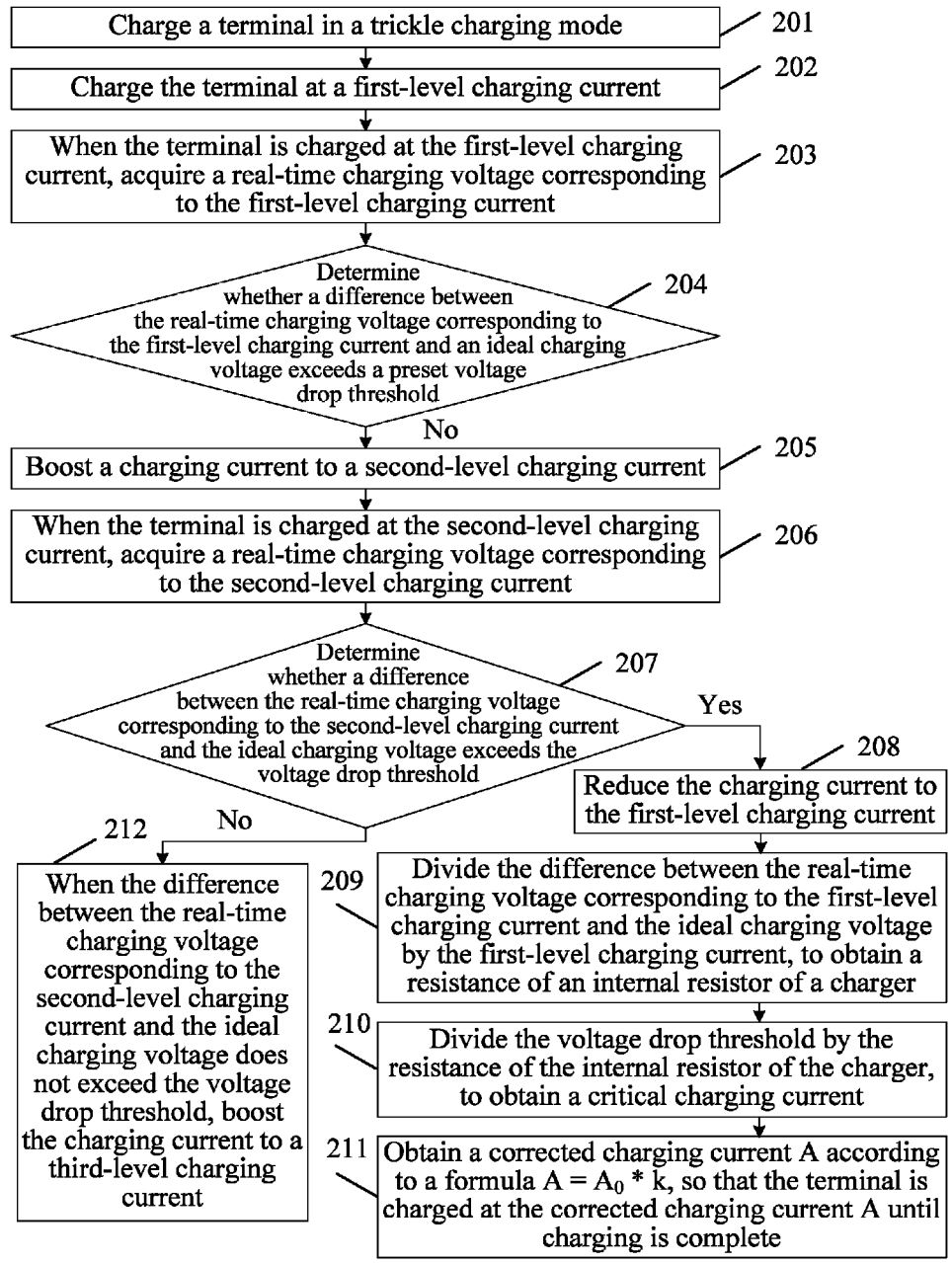
FIG. 2 is a flowchart of a charging method according to Embodiment 2 of the present invention.

This embodiment of the present invention provides a charging method. For the convenience of description, in this embodiment of the present invention, a charging current of a charger is set to three levels, namely, a first-level charging current, a second-level charging current, and a third-level charging current. As shown in FIG. 2, the charging method includes the following steps.

201: Charge a terminal in a trickle charging mode.

When a charging voltage during trickle charging reaches a predetermined constant current charging voltage, constant charging starts to be performed. Specifically, when constant current charging is performed, the following step 202 is first performed.

202: Charge the terminal at a first-level charging current.

203: When the terminal is charged at the first-level charging current, acquire a real-time charging voltage corresponding to the first-level charging current, where the first-level charging current is a charging current with the smallest current value in the preset levels of charging current.

204: Determine whether a difference between the real-time charging voltage corresponding to the first-level charging current and an ideal charging voltage exceeds a preset voltage drop threshold.

The ideal charging voltage is an electromotive force provided by a charging power supply when a charging circuit is not connected to load.

In order to avoid a phenomenon that a short circuit occurs in the charging circuit because the charging current is greater than a maximum load current of the charger, the voltage drop threshold is set to limit the difference between the real-time charging voltage and the ideal charging voltage. Because the difference between the real-time charging voltage and the ideal charging voltage is equal to a divided voltage on an internal resistor of the charging circuit, the voltage drop threshold is a maximum divided voltage generated when the maximum load current of the charger passes the internal resistor of the charger.

205: When the difference between the real-time charging voltage corresponding to the first-level charging current and the ideal charging voltage does not exceed the voltage drop threshold, boost a charging current to a next-level charging current of the first-level charging current, that is, a second-level charging current.

In an actual application scenario, the first-level current may be set to a low current, so that a drop value of the real-time charging voltage is far less than the voltage drop threshold when charging is performed by using the low current. When the difference between the real-time charging voltage corresponding to the first-level charging current and the ideal charging voltage does not exceed the voltage drop threshold, the charging current is boosted to the next-level charging current of the first-level charging current. For example, a charging voltage of an ideal charger is 5 V, a voltage drop threshold is 0.5 V, and the terminal is charged at a multi-level ascending charging current. When the terminal is charged at a first-level charging current of 10 mA, and a corresponding real-time charging voltage of 4.98 V is acquired, the difference between the real-time charging voltage corresponding to the first-level charging current and the ideal charging voltage is 0.02 V, and does not exceed the voltage drop threshold of 0.5 V, and then the charging current is boosted to the second-level charging current.

206: When the terminal is charged at the second-level charging current, acquire a real-time charging voltage corresponding to the second-level charging current.

If the difference between the real-time charging voltage corresponding to the first-level charging current and the ideal charging voltage does not exceed the voltage drop threshold, the charging current is boosted to the second-level charging current; if a difference between the real-time charging voltage corresponding to the second-level charging current and the ideal charging voltage does not exceed the voltage drop threshold, the charging current is boosted to a third-level charging current; similarly, when the terminal is charged at a multi-level ascending charging current, the real-time charging voltage corresponding to the present charging current is acquired for determining.

207: Determine whether a difference between the real-time charging voltage corresponding to the second-level charging current and the ideal charging voltage exceeds the voltage drop threshold.

When the difference between the real-time charging voltage corresponding to the second-level charging current and the ideal charging voltage exceeds the preset voltage drop threshold, step 208 is performed; when the difference between the real-time charging voltage corresponding to the second-level charging current and the ideal charging voltage does not exceed the preset voltage dip threshold, step 212 is performed.

After the real-time charging voltage corresponding to the second-level charging current is acquired, the difference between the real-time charging voltage corresponding to the second-level charging current and the ideal charging voltage is obtained, and then, the difference is compared with the voltage drop threshold for determining. For example, a charging voltage of an ideal charger is 5 V, a voltage drop threshold is 0.5 V, and the terminal is charged at a multi-level ascending charging current. When the terminal is charged at the second-level charging current, the corresponding real-time charging voltage of 4.99 V is acquired, and the difference between the real-time charging voltage corresponding to the second-level charging current and the ideal charging voltage is 0.01 V, and does not exceed the voltage drop threshold of 0.5 V.

208: When the difference between the real-time charging voltage corresponding to the second-level charging current and the ideal charging voltage exceeds the voltage drop threshold, reduce the charging current to the first-level charging current.

For example, a charging voltage of another ideal charger is 4 V, a voltage drop threshold is 0.3 V, and the terminal is charged at a multi-level ascending charging current. When the terminal is charged at the second-level charging current of 200 mA, the corresponding real-time charging voltage of 3.3 V is acquired, the difference between the real-time charging voltage corresponding to the second-level charging current and the ideal charging voltage is 0.7 V, and exceeds the voltage drop threshold of 0.3 V, and then the charging current is reduced to the first-level charging current.

209: Divide the difference between the real-time charging voltage corresponding to the first-level charging current and the ideal charging voltage by the first-level charging current, to obtain a resistance of an internal resistor of a charger.

When the present charging current is reduced to a previous-level charging current, a difference between a real-time charging voltage corresponding to the previous-level charging current and the ideal charging voltage is acquired, and the difference is divided by the previous-level charging current, that is, the resistance of the internal resistor of the charger is obtained by using a calculation formula, which is a resistance R of an internal resistor of a charger=(an ideal charging voltage−a real-time charging voltage corresponding to a previous-level charging current)/the previous-level charging current. For example, a charging voltage of another ideal charger is 4 V, a voltage drop threshold is 0.3 V, and the terminal is charged at a multi-level ascending charging current. When the terminal is charged at the second-level charging current of 200 mA, and the corresponding real-time charging voltage of 3.3 V is acquired, the difference between the real-time charging voltage corresponding to the second-level charging current and the ideal charging voltage is 0.7 V, and exceeds the voltage drop threshold of 0.3 V, and then the charging current is reduced to the first-level charging current, where the first-level charging current is 10 mA. When the terminal is charged at the first-level charging current of 10 mA, the real-time charging voltage of 3.98 V corresponding to the first-level charging current of 10 mA is acquired, the ideal charging voltage of the charger is 4 V, then the difference between the real-time charging voltage corresponding to the first-level charging current and the ideal charging voltage is 0.02 V, and then, the resistance R of the internal resistor of the charger can be obtained by using a calculation formula of the internal resistance of the charger, where R=0.02V/10 mA=2 Ohms ($\Omega$).

210: Divide the voltage drop threshold by the resistance of the internal resistor of the charger, to obtain a critical charging current.

After the resistance of the internal resistor of the charger is obtained through calculation, because the voltage drop threshold is a voltage generated when the maximum load current of the charger passes the internal resistor of the charger, a calculation formula can be used, which is a critical current $A_0$ of a charger=a voltage drop threshold/a resistance value of an internal resistor of a charger, where the critical current is a minimum load current used when the charger normally works. For example, a charging voltage of another ideal charger is 4 V, a voltage drop threshold is 0.3 V, and the terminal is charged at a multi-level ascending charging current; when the charging current is reduced to the first-level charging current of 10 mA, the resistance of the internal resistor of the charger, 2$\Omega$, is obtained through calculation, and then, a critical current of the charger=0.3V/2$\Omega$=150 mA.

211: Obtain a corrected charging current A according to a formula $A=A_0*k$, so that the terminal is charged at the corrected charging current A until charging is complete.

$A_0$ is the critical charging current, and k is a parameter less than 1 and greater than 0.

As a charging time increases, an internal temperature of the charger increases; because a resistance of a resistor increases as the temperature increases, if the terminal is charged at a critical current, when the resistance of the internal resistor of the charger increases as the temperature increases, a divided voltage on the internal resistor of the charger exceeds the voltage drop threshold, causing a short circuit of the charger. Therefore, in order to avoid effects caused by temperature increasing on working performance of the charger, a current correction parameter k is set, where k is a parameter less than 1 and greater than 0, and can be selected from 0.8 to 0.9. For example, it is obtained through calculation that a critical current of a charger is 150 mA and a predetermined current correction parameter k is 0.8, and then the corrected charging current A=150 mA×0.8=120 mA. Then, the terminal is charged at the corrected charging current of 120 mA until charging is complete.

212: When the difference between the real-time charging voltage corresponding to the second-level charging current and the ideal charging voltage does not exceed the voltage drop threshold, boost the charging current to a third-level charging current.

After the second-level charging current is boosted to the third-level charging current, the following three cases may occur.

S1: A difference between a real-time charging voltage corresponding to the third-level charging current and the ideal charging voltage exceeds the voltage drop threshold.

In this case, the charging current needs to be reduced to the second-level charging current, a corrected charging current for the second-level charging current is obtained according to step 209 to step 211, and then, charging is performed at the corrected charging current until charging is complete.

S2: The difference between the real-time charging voltage corresponding to the third-level charging current and the ideal charging voltage does not exceed the voltage drop threshold.

Because the third-level charging current in this embodiment of the present invention is the highest-level charging current, and cannot be further boosted, charging is performed at the third-level charging current until charging is complete.

For example, a charging voltage of an ideal charger is 5 V, a voltage drop threshold is 0.5 V, and the terminal is charged at a multi-level ascending charging current, where there are three charging current levels in total. When the terminal is charged at the first-level charging current, the corresponding real-time charging voltage of 4.99 V is acquired, the difference between the real-time charging voltage corresponding to the first-level charging current and the real-time charging voltage is 0.01 V and does not exceed the voltage drop threshold of 0.5 V, and then, the charging current is boosted to the second-level charging current; after the charging current is boosted to the second-level charging current, the real-time charging voltage of 1.98 V corresponding to the second-level charging current is acquired, the difference between the real-time charging voltage corresponding to the second-level charging current and the ideal charging voltage is 0.02 V and does not exceed the voltage drop threshold 0.5 V, and then, the charging current is boosted to the third-level charging current. If the difference between the real-time charging voltage corresponding to the third-level charging current and the ideal charging voltage does not exceed the voltage drop threshold, charging is performed at the third-level charging current until charging is complete.

It should be noted that, for specific description of some steps in Embodiment 2 of the present invention, reference may be made to corresponding content in Embodiment 1, and details are not described in this embodiment of the present invention again.

It should be noted again that, for the convenience of description, three charging current levels are set in this embodiment of the present invention, an actual application is not limited thereto, and there may be two, four, or five charging current levels.

According to the charging method provided in this embodiment of the present invention, a multi-level charging current is set; when a terminal is charged at a present charging current, a real-time charging voltage corresponding to the present charging current is acquired; it is determined whether a difference between the real-time charging voltage corresponding to the present charging current and an ideal charging voltage exceeds a voltage drop threshold; when the difference does not exceed the voltage drop threshold, a charging current is boosted to a next-level charging current; and when the difference exceeds the voltage drop threshold, the charging current is reduced to a previous-level charging current, so as to select an appropriate charging current to charge the terminal. Compared with the prior art in which charging is performed by using a fixed high current, the present invention can adjust the charging current in real time according to a current load capacity of a charger, and avoid a phenomenon that a short circuit occurs in the charger due to a charging current greater than a maximum load current.

In addition, in the present invention, first, a difference between a real-time charging voltage corresponding to a charging current whose level is reduced and the ideal charging voltage is divided by the charging current whose level is reduced, to obtain a resistance of an internal resistor of the charger; second, the voltage drop threshold is divided by the resistance of the internal resistor of the charger, to obtain a critical charging current; and finally, a current correction parameter is set, a corrected charging current is obtained through calculation, and the terminal is charged at the corrected charging current until charging is complete. In a case in which the charging current does not exceed the maximum load current of the charger, the charging current can be increased, a charging time can be shortened, and working efficiency of the charger can be improved.

Embodiment 3

Figure 3:
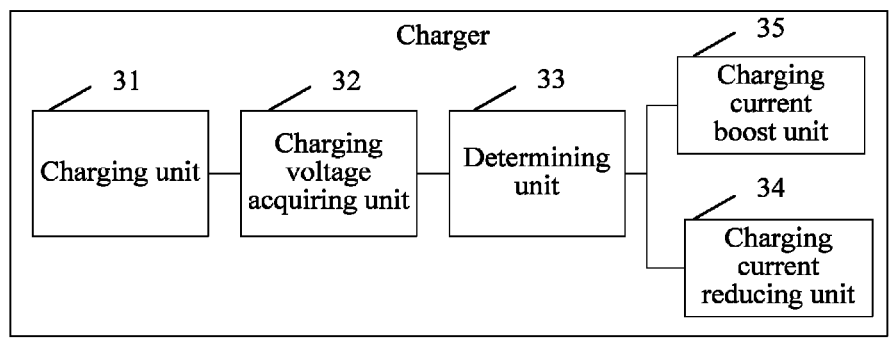
FIG. 3 is a schematic structural diagram of a charger according to Embodiment 3 of the present invention.

This embodiment of the present invention provides a charger. As shown in FIG. 3, the charger includes a charging unit 31, a charging voltage acquiring unit 32, a determining unit 33, a charging current boost unit 35, and a charging current reducing unit 34, where the charging unit 31 is configured to charge a terminal; the charging voltage acquiring unit 32 is configured to, when the terminal is charged at a present charging current, acquire a real-time charging voltage corresponding to the present charging current; the determining unit 33 is configured to determine whether a difference between the real-time charging voltage corresponding to the present charging current and an ideal charging voltage exceeds a preset voltage drop threshold, where the ideal charging voltage is an electromotive force provided by a charging power supply when a charging circuit is not connected to load, and the voltage drop threshold is a maximum divided voltage generated when a maximum load current of the charger passes an internal resistor of the charger; the charging current reducing unit 34 is configured to, when the difference between the real-time charging voltage corresponding to the present charging current and the ideal charging voltage exceeds the voltage drop threshold, reduce a charging current to a previous-level charging current of the present charging current, so that the terminal is charged at the previous-level charging current; and the charging current boost unit 35 is configured to, when the difference between the real-time charging voltage corresponding to the present charging current and the ideal charging voltage does not exceed the voltage drop threshold, boost the charging current to a next-level charging current of the present charging current, so that the determining unit 33 continues to determine whether the difference between the real-time charging voltage and the ideal charging voltage exceeds the voltage drop threshold, and when the difference does not exceed the voltage drop threshold, continue to boost the charging current until reaching the highest-level charging current.

In addition, the charging unit 31 is further configured to, before the terminal is charged at the present charging current, charge the terminal in a trickle charging mode until a charging voltage reaches a predetermined voltage at a constant current degree.

Figure 4:
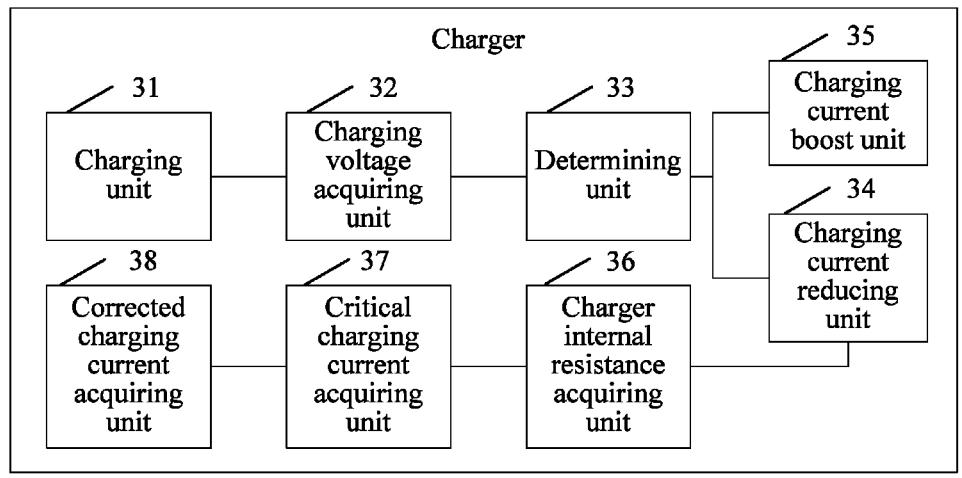
FIG. 4 is a schematic structural diagram of another charger according to Embodiment 3 of the present invention.

Further, as shown in FIG. 4, the charger further includes a charger internal resistance acquiring unit 36, a critical charging current acquiring unit 37, and a corrected charging current acquiring unit 38, where the charger internal resistance acquiring unit 36 is configured to, after the charging current is reduced to the previous-level charging current of the present charging current, divide a difference between a real-time charging voltage corresponding to the previous-level charging current and the ideal charging voltage by the previous-level charging current, to obtain a resistance of the internal resistor of the charger; the critical charging current acquiring unit 37 is configured to divide the voltage drop threshold by the resistance of the internal resistor of the charger, to obtain a critical charging current; and the corrected charging current acquiring unit 38 is configured to obtain a corrected charging current A according to a formula $A=A_0*k$, so that the terminal is charged at the corrected charging current A until charging is complete, where $A_0$ is the corrected charging current, and k is a parameter less than 1 and greater than 0.

Further, the charger further includes that the charging voltage acquiring unit 32 and the determining unit 33 are integrated in an ADC voltage detection chip or a voltage comparator.

It should be noted that, for specific description of some units in the charger provided in Embodiment 3 of the present invention, reference may be made to corresponding content in Embodiment 1 and Embodiment 2, and details are not described in this embodiment of the present invention again.

The charger provided in this embodiment of the present invention sets a multi-level charging current; when charging a terminal at a present charging current, acquires a real-time charging voltage corresponding to the present charging current; determines whether a difference between the real-time charging voltage corresponding to the present charging current and an ideal charging voltage exceeds a voltage drop threshold; when the difference does not exceed the voltage drop threshold, boosts a charging current to a next-level charging current; and when the difference exceeds the voltage drop threshold, reduces the charging current to a previous-level charging current, so as to select an appropriate charging current to charge the terminal. Compared with the prior art in which charging is performed by using a fixed high current, the present invention can adjust the charging current in real time according to a current load capacity of the charger, and avoid a phenomenon that a short circuit occurs in the charger due to a charging current greater than a maximum load current.

In addition, in the present invention, first, a difference between a real-time charging voltage corresponding to a charging current whose level is reduced and the ideal charging voltage is divided by the charging current whose level is reduced, to obtain a resistance of an internal resistor of the charger; second, the voltage drop threshold is divided by the resistance of the internal resistor of the charger, to obtain a critical charging current; and finally, a current correction parameter is set, a corrected charging current is obtained through calculation, and the terminal is charged at the corrected charging current until charging is complete. Based on a case in which the charging current does not exceed the maximum load current of the charger, the charging current is increased, a charging time is shortened, and working efficiency of the charger is improved.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A charging method, comprising:
   acquiring, by a charging voltage acquiring unit, a real-time charging voltage corresponding to a present charging current when a terminal is charged at the present charging current;
   determining, by a determining unit, whether a difference between the real-time charging voltage corresponding to the present charging current and an ideal charging voltage exceeds a preset voltage drop threshold, wherein the ideal charging voltage is an electromotive force provided by a charging power supply when a charging circuit is not connected to load, and wherein the voltage drop threshold is a voltage generated when a maximum load current of a charger passes an internal resistor of the charger;
   reducing, by a charging current reducing unit, a charging current to a previous-level charging current of the present charging current such that the terminal is charged at the previous-level charging current when the difference between the real-time charging voltage corresponding to the present charging current and the ideal charging voltage exceeds the voltage drop threshold;
   boosting, by a charging current boost unit, the charging current to a next-level charging current of the present charging current such as to continue to determine whether the difference between the real-time charging voltage and the ideal charging voltage exceeds the voltage drop threshold when the difference between the real-time charging voltage corresponding to the present charging current and the ideal charging voltage does not exceed the voltage drop threshold;
   continuing to boost the charging current to the highest-level charging current when the difference does not exceed the voltage drop threshold, and
   wherein after reducing, by the charging current reducing unit, the charging current to the previous-level charging current of the present charging current, the method further comprises:

dividing, by a charger internal resistance acquiring unit, a difference between a real-time charging voltage corresponding to the previous-level charging current and the ideal charging voltage by the previous-level charging current, to obtain a resistance of the internal resistor of the charger;

dividing, by a critical charging current acquiring unit, the voltage drop threshold by the resistance of the internal resistor of the charger, to obtain a critical charging current; and obtaining, by a corrected charging current acquiring unit, a corrected charging current A according to a formula $A=A_0*k$ such that the terminal is charged at the corrected charging current A until charging is complete, wherein $A_0$ is the critical charging current, and wherein k is a parameter less than 1 and greater than 0.

2. The method according to claim 1, wherein before the terminal is charged at the present charging current, the method further comprises charging the terminal in a trickle charging mode until a charging voltage reaches a predetermined voltage at a constant current degree.

3. A charger, comprising:
a charging unit configured to charge a terminal;
a charging voltage acquiring unit configured to, when the terminal is charged at a present charging current, acquire a real-time charging voltage corresponding to the present charging current;
a determining unit configured to determine whether a difference between the real-time charging voltage corresponding to the present charging current and an ideal charging voltage exceeds a preset voltage drop threshold, wherein the ideal charging voltage is an electromotive force provided by a charging power supply when a charging circuit is not connected to load, and wherein the voltage drop threshold is a voltage generated when a maximum load current of the charger passes an internal resistor of the charger;
a charging current reducing unit configured to, when the difference between the real-time charging voltage corresponding to the present charging current and the ideal charging voltage exceeds the voltage drop threshold, reduce a charging current to a previous-level charging current of the present charging current such that the terminal is charged at the previous-level charging current;
a charging current boost unit configured to, when the difference between the real-time charging voltage corresponding to the present charging current and the ideal charging voltage does not exceed the voltage drop threshold, boost the charging current to a next-level charging current of the present charging current such that the determining unit continues to determine whether the difference between the real-time charging voltage and the ideal charging voltage exceeds the voltage drop threshold, and when the difference does not exceed the voltage drop threshold, continue to boost the charging current until reaching the highest-level charging current;
a charger internal resistance acquiring unit configured to, after the charging current is reduced to the previous-level charging current of the present charging current, divide a difference between a real-time charging voltage corresponding to the previous-level charging current and the ideal charging voltage by the previous-level charging current, to obtain a resistance of the internal resistor of the charger;

a critical charging current acquiring unit configured to divide the voltage drop threshold by the resistance of the internal resistor of the charger, to obtain a critical charging current; and a corrected charging current acquiring unit configured to obtain a corrected charging current A according to a formula $A=A_0*k$ such that the terminal is charged at the corrected charging current A until charging is complete, wherein $A_0$ is the corrected charging current, and wherein k is a parameter less than 1 and greater than 0.

4. The charger according to claim 3, wherein the charging unit is further configured to, before the terminal is charged at the present charging current, charge the terminal in a trickle charging mode until a charging voltage reaches a predetermined voltage at a constant current degree.

5. The charger according to claim 3, wherein the charging voltage acquiring unit and the determining unit are integrated in an analog-to-digital converter (ADC) voltage detection chip.

6. The charger according to claim 3, wherein the charging voltage acquiring unit and the determining unit are integrated in a voltage comparator.

7. A charging method, comprising:
acquiring, by a charging voltage acquiring unit, a real-time charging voltage corresponding to a present charging current when a terminal is charged at the present charging current;
determining, by a determining unit, whether a difference between the real-time charging voltage corresponding to the present charging current and an ideal charging voltage exceeds a preset voltage drop threshold, wherein the ideal charging voltage is an electromotive force provided by a charging power supply when a charging circuit is not connected to load, and wherein the voltage drop threshold is a voltage generated when a maximum load current of a charger passes an internal resistor of the charger;
reducing, by a charging current reducing unit, a charging current to a previous-level charging current of the present charging current such that the terminal is charged at the previous-level charging current when the difference between the real-time charging voltage corresponding to the present charging current and the ideal charging voltage exceeds the voltage drop threshold;
dividing, by a charger internal resistance acquiring unit, a difference between a real-time charging voltage corresponding to the previous-level charging current and the ideal charging voltage by the previous-level charging current, to obtain a resistance of the internal resistor of the charger;
dividing, by a critical charging current acquiring unit, the voltage drop threshold by the resistance of the internal resistor of the charger, to obtain a critical charging current; and
obtaining, by a corrected charging current acquiring unit, a corrected charging current A according to a formula $A=A_o*k$ such that the terminal is charged at the corrected charging current A until charging is complete, wherein Ao is the critical charging current, and wherein k is a parameter less than 1 and greater than 0.

8. The method according to claim 7, wherein before the terminal is charged at the present charging current, the method further comprises charging the terminal in a trickle charging mode until a charging voltage reaches a predetermined voltage at a constant current degree.

* * * * *